United States Patent

Scott

[11] Patent Number: 5,909,104
[45] Date of Patent: Jun. 1, 1999

[54] ELECTROSTATIC ENHANCED LITHIUM BATTERY CIRCUIT

[75] Inventor: Kevin D. Scott, Lawrenceville, Ga.

[73] Assignee: Motorola, Inc., Schaumburg, Ill.

[21] Appl. No.: 09/030,782

[22] Filed: Feb. 26, 1998

[51] Int. Cl.$^6$ ........................................... H01M 10/46
[52] U.S. Cl. ....................................................... 320/136
[58] Field of Search ........................... 320/112, 124, 320/127, 128, 132, 134, 136

[56] References Cited

U.S. PATENT DOCUMENTS 5,568,039  10/1996  Fernandez.

OTHER PUBLICATIONS

Seiko Instrument Data Sheet CMOS LSI Data Book, no date.

*Primary Examiner*—Edward H. Tso
*Attorney, Agent, or Firm*—Felipe J. Farley

[57] ABSTRACT

A lithium battery pack (100) comprises a battery cell (102) and a safety circuit (104). The safety circuit prevents overcharge and overdischarge of the battery cell. The safety circuit comprises a battery control IC (106) which senses the battery voltage, and operates a switch circuit (114) to open if an overvoltage or undervoltage condition is sensed. In a conventional battery pack, the safety circuit will trip, opening the switch circuit, upon the application of a 15 kV ESD pulse to one of the battery contacts (126 or 128). The invention solves this problem by the use of a first resistor (108) and a second resistor (110) coupled between the battery control IC and the first resistor, in conjunction with a capacitor (112).

20 Claims, 1 Drawing Sheet

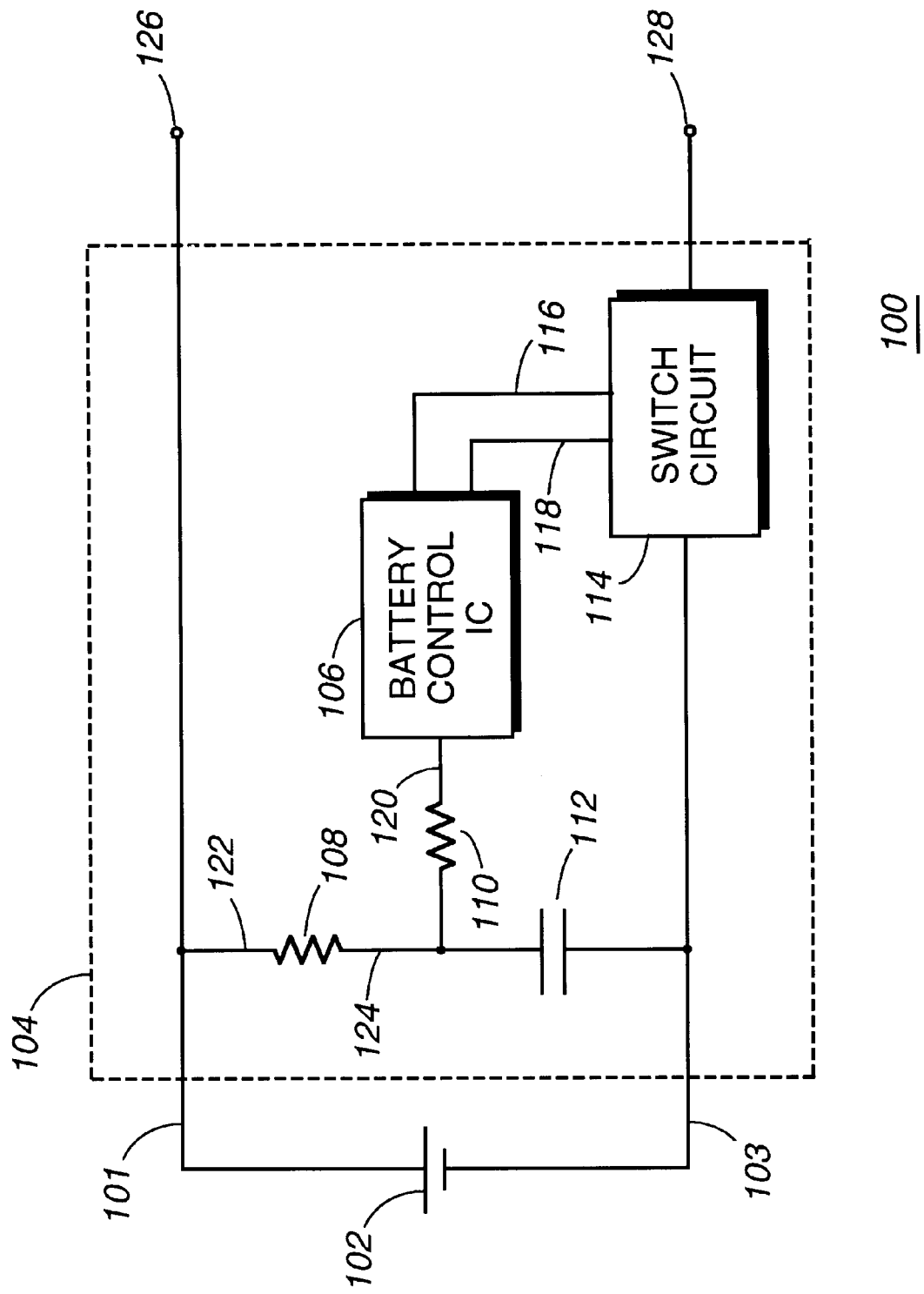

ELECTROSTATIC ENHANCED LITHIUM BATTERY CIRCUIT

TECHNICAL FIELD

This invention relates in general to battery circuits, and more particularly to battery circuits for use with lithium and lithium ion based batteries and battery packs.

BACKGROUND OF THE INVENTION

Secondary or rechargeable battery packs are in widespread use as the principal power source for mobile equipment such as cellular telephones and portable computers. As such, it is desirable to have a lightweight battery pack that stores an adequate amount energy so that the user of the battery powered device is not inconvenienced with having to carry spare battery packs, or stop using the device while the battery pack is recharged. Recently a number of lithium based battery chemistries, such as the so called lithium ion battery has appeared, and provides a superior energy storage to weight ratio over conventional chemistries such as nickel/cadmium and nickel/metal-hydride.

However, lithium batteries made for consumer electronics require safety circuitry within the battery pack to prevent excessive voltage levels from being applied to the battery cell or cells. Should an excessive voltage be applied to such a cell, the cell could malfunction and pose a safety hazard. Safety circuits must therefore be robust and able to withstand reasonable electrical stress, such as that caused by electrostatic discharge events.

An electrostatic discharge event occurs when a person has become charged with static electricity, and then dissipates the charge into the battery pack upon coming into intimate proximity with the battery pack. Many studies have been done to characterize static charge accumulation on humans, and it is not uncommon for voltage levels to reach as high as 20 Kilovolts (kV) under favorable conditions. However, it is more likely that a typical person, under normal circumstances, will achieve a peak static voltage level of 10 kV to 15 kV. Even at such high levels, conventional circuit design techniques can be used to prevent damage of the safety circuit from occurring at these levels, but it is a much more difficult task to prevent the mis-operation of the safety circuit upon a discharge event at these level, particularly when the battery voltage is near an upper voltage limit.

A mis-operation of a battery circuit can result in the battery pack being temporarily disabled until the safety circuitry can be reset. Obviously a disabled battery pack can be problematic for a user, especially if the user does not have the means to reset the safety circuit at hand. Therefore there exists a need for an electrostatic enhanced lithium battery circuit that can withstand high level electrostatic discharge (ESD) e vents without a mis-operation.

BRIEF DESCRIPTION OF THE DRAWING

The FIGURE is a an enhanced lithium battery circuit in accordance with the invention.

DETAILED DESCRIPTION OF A PREFERRED EMBODIMENT

While the specification concludes with claims defining the features of the invention that are regarded as novel, it is believed that the invention will be better understood from a consideration of the following description in conjunction with the drawing figures, in which like reference numerals are carried forward.

The invention solves the problem of mis-operation as a result of an ESD event by providing a resistor network for powering the battery control integrated circuit (IC). Referring now to the drawing, there is shown an electrostatic enhanced lithium battery pack 100. The battery pack 100 comprises at least one lithium battery cell 102, such as a lithium ion battery cell, and exactly one lithium ion cell in the preferred embodiment. The battery cell or cells are electrically disposed between a positive line 101 and a negative line 103. The battery pack further comprises a safety circuit 104. The safety circuit, among other functions, prevents overcharge and overdischarge of the battery cell or cells 102. The safety circuit 104 comprises a battery control IC 106, a first resistor 108, a second resistor 110, a capacitor 112, and a switch circuit 114.

The battery control IC 106 is a safety IC, such as that manufactured by Seiko, Inc., and sold under the trade designation S-8941 [KEVIN: DO YOU HAVE A DATA SHEET FOR THE SEIKO PART?]. The battery control IC is responsive to the battery voltage of the battery cell or cells 102, and operates the switch circuit 114, which is responsive to the battery control IC via lines 116 and 118, such that the switch circuit changes from a low impedance state to a high impedance state upon the battery control IC detecting the battery voltage reaching an overvoltage level or an undervoltage level. Typically the overvoltage level is selected to be in the range of 4.1 volts to 4.4 volts, while the undervoltage level is selected to be in the range of 1.5 volts to 2.5 volts, as is conventional in the art. The switch circuit 114 is disposed electrically in series with the battery cell or cells 102, and typically comprises a pair of switch transistors, such as, for example, N-channel enhancement mode metallic oxide semiconductor field effect transistors (MOSFET). As is well known in the art, a first MOSFET is used to prevent overcharging while a second MOSFET is used to prevent overdischarging. If either the overvoltage limit or the undervoltage limit is sensed by the battery control IC, the voltage on the appropriate line, either 116 or 118, will be dropped from a high level to a low level, thus removing bias from the appropriate switch transistor, and thus interrupting the flow of electric current through the battery cell or cells.

The battery control IC has a power pin 120 where electrical power to operate the battery control IC is applied, and through which the battery voltage is sensed. The battery voltage is fed through the first and second resistors, 108 and 110 respectively, and filtered somewhat by the capacitor 112. The first resistor has a first end 122 electrically coupled to the positive line 101, and a second end 124. The capacitor is electrically coupled between the second end 124 of the first resistor and the negative line 103. The second resistor is electrically coupled between the second end 124 of the first resistor and the power pin 120 of the battery control IC. The battery control IC draws very little current, and the combined resistance of the first and second resistors is small enough such that the voltage drop across them is negligible.

In practicing the invention, it has been determined that the first and second resistor should have resistance values in the range of 100 ohms to 1000 ohms [THIS WAS AN ARBITRARY CHOICE, DO YOU HAVE A PREFERENCE?]. Through testing, it has been determined that an optimum resistance for each is about 510 ohms. An ESD (electrostatic discharge) pulse can enter the battery through, for example, a positive battery contact 126, or a negative battery contact 128. The positive line 101 is electrically connected to the positive battery contact and the negative line 103 is electrically connected to the negative battery contact, while the switch circuit is in a low impedance state. The first and second resistors, in cooperation with the capacitor, reduce the effect of an ESD event at the power pin 120, and thus reduce the tendency of the battery control IC to falsely sense an overvoltage condition and turn off the switch circuit, known in the art as tripping. The capacitance of the capacitor is selected from the range of 0.10 microfarads to 10.0 microfarads, and preferably is 1.0 microfarads.

Through testing, it was found that a battery circuit configured in accordance with the preferred embodiment could withstand ESD events of as much as about ±15 kilovolts (kV) when the battery voltage was as high as 4.2 volts. It was found that if the second resistor 110 was replaced with a zero ohm jumper, the safety circuit performance was significantly reduced, resulting in the switch circuit opening when ESD levels approaching ±15 kV were applied to the battery contacts 126 and 128. Because of the finite amount of charge stored on a human body, an ESD event is short lived, and on the order of microseconds.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. An electrostatic enhanced lithium battery circuit for a lithium battery having at least one lithium battery cell electrically disposed between a positive line and a negative line, the battery circuit comprising:

a battery control integrated circuit (IC) having a power pin;

a first resistor having a first end and a second end, the first end electrically coupled to the positive line;

a capacitor electrically coupled between the second end of the first resistor and the negative line; and a second resistor coupled between second end of the first resistor and the power pin of the battery control IC.

2. An electrostatic enhanced lithium battery circuit as defined in claim 1, further comprising a switch circuit coupled in series with the at least one battery cell, and responsive to the battery control IC.

3. An electrostatic enhanced lithium battery circuit as defined in claim 1, wherein the first resistor has a resistance in the range of 100 ohms to 1000 ohms.

4. An electrostatic enhanced lithium battery circuit as defined in claim 3 wherein the resistance of the first resistor is about 510 ohms.

5. An electrostatic enhanced lithium battery circuit as defined in claim 1, wherein the second resistor has a resistance in the range of 100 ohms to 1000 ohms.

6. An electrostatic enhanced lithium battery circuit as defined in claim 5 wherein the resistance of the second resistor is about 510 ohms.

7. An electrostatic enhanced lithium battery circuit as defined in claim 1, wherein the capacitor has a capacitance in the range of 0.10 microfarads to 10.0 microfarads.

8. An electrostatic enhanced lithium battery circuit as defined in claim 7 wherein the capacitance of the capacitor is about 1.0 microfarad.

9. An electrostatic enhanced lithium battery pack, comprising:

at least one battery cell electrically disposed between a positive line and a negative line;

a battery control integrated circuit (IC) having a power pin;

a first resistor having a first end and a second end, the first end electrically coupled to the positive line;

a capacitor electrically coupled between the second end of the first resistor and the negative line; and a second resistor coupled between second end of the first resistor and the power pin of the battery control IC.

10. An electrostatic enhanced lithium battery circuit as defined in claim 9, wherein the at least one battery cell is at least one lithium ion battery cell.

11. An electrostatic enhanced lithium battery circuit as defined in claim 10, wherein the at least one lithium ion battery cell is exactly one lithium ion battery cell.

12. An electrostatic enhanced lithium battery circuit as defined in claim 9, further comprising a switch circuit coupled in series with the at least one battery cell, and responsive to the battery control IC.

13. An electrostatic enhanced lithium battery circuit as defined in claim 9, wherein the first resistor has a resistance in the range of 100 ohms to 1000 ohms.

14. An electrostatic enhanced lithium battery circuit as defined in claim 13 wherein the resistance of the first resistor is about 510 ohms.

15. An electrostatic enhanced lithium battery circuit as defined in claim 9, wherein the second resistor has a resistance in the range of 100 ohms to 1000 ohms.

16. An electrostatic enhanced lithium battery circuit as defined in claim 15 wherein the resistance of the second resistor is about 510 ohms.

17. An electrostatic enhanced lithium battery circuit as defined in claim 9, wherein the capacitor has a capacitance in the range of 0.10 microfarads to 10.0 microfarads.

18. An electrostatic enhanced lithium battery circuit as defined in claim 17 wherein the capacitance of the capacitor is about 1.0 microfarad.

19. An electrostatic enhanced lithium battery pack, comprising:

at least one battery cell electrically disposed between a positive line and a negative line, the positive line electrically connected to a positive battery contact, the negative line electrically connected to a negative battery contact;

a battery control integrated circuit (IC) having a power pin;

a switch circuit coupled in series with the at least one battery cell, the switch circuit responsive to the battery control IC;

a first resistor having a first end and a second end, the first end electrically coupled to the positive line;

a capacitor electrically coupled between the second end of the first resistor and the negative line; and a second resistor coupled between second end of the first resistor and the power pin of the battery control IC;

wherein the battery control IC is responsive to a battery voltage of the at least one battery cell and operates the switch circuit such that the switch circuit changes from a low impedance state to a high impedance state upon the battery control IC detecting the battery voltage reaching an overvoltage level; and wherein an electrostatic discharge of not more than 15 Kilovolts applied to either of the battery contacts while the battery voltage is not greater than 4.2 volts does not cause the battery control IC to sense an overvoltage level of the battery voltage.

20. An electrostatic enhanced lithium battery pack as defined in claim 1, wherein the at least one battery cell is exactly one lithium ion battery cell.

\* \* \* \* \*